United States Patent [19]

Andersson

[11] 4,451,585

[45] May 29, 1984

[54] RESIN-IMPREGNATED FIBRE COMPOSITE MATERIALS AND A PROCESS FOR THEIR MANUFACTURE

[75] Inventor: Bengt Andersson, Söråker, Sweden

[73] Assignee: KemaNord AB, Stockholm, Sweden

[21] Appl. No.: 386,614

[22] Filed: Jun. 9, 1982

Related U.S. Application Data

[63] Continuation-in-part of Ser. No. 345,624, Feb. 4, 1982, abandoned.

[30] Foreign Application Priority Data

Feb. 5, 1981 [SE] Sweden .................................. 8100819

[51] Int. Cl.³ ............................................. C08J 9/32
[52] U.S. Cl. .................................... 521/59; 521/54; 521/136
[58] Field of Search ............................ 521/54, 59, 136

[56] References Cited

U.S. PATENT DOCUMENTS

| | | | |
|---|---|---|---|
| 2,806,509 | 9/1957 | Bozzocco et al. | 521/54 |
| 3,730,920 | 5/1973 | D'Alesandro | 521/54 |
| 3,842,020 | 10/1974 | Garrett | 521/54 |
| 4,005,033 | 1/1977 | Georgeau et al. | 521/54 |
| 4,108,806 | 8/1978 | Cohrs et al. | 521/54 |
| 4,309,334 | 1/1982 | Valitsky | 521/54 |

*Primary Examiner*—Morton Foelak
*Attorney, Agent, or Firm*—Fred Philpitt

[57] ABSTRACT

The invention relates to a method for producing a fibre composite material, which comprises glass- and/or mineral fibres, expanded microspheres and a curable resin. In the method a melt of glass or mineral is prepared and the melt is converted to discrete fibres by means of nozzles. A water-based solution or dispersion of a thermosetting resin is applied to the fibres, which solution or dispersion contains microspheres. The obtained material is collected and the microspheres are brought to expand before or after the collecting. The invention also relates to a final treatment of the obtained material in which the material is pressed or formed and brought to set to the C-stage. The invention also relates to the products obtained by the method.

10 Claims, No Drawings

RESIN-IMPREGNATED FIBRE COMPOSITE MATERIALS AND A PROCESS FOR THEIR MANUFACTURE

This is a continuation-in-part of U.S. Ser. No. 345,624, filed Feb. 4, 1982, now abandoned.

The present invention relates to a resin-impregnated fibre composite material and to a method for manufacturing such a material. More specifically, the invention relates to a simplified method for manufacturing a fibre composite material which is impregnated with a curable resin and which contains expanded thermoplastic particles of the kind generally referred to as microspheres.

From the Swedish patent application No. 8003776-5 a foam composite material is known, which composite material comprises a web of woven or non-woven material, impregnated with a thermo-setting resin and containing expanded microspheres. This foam composite material can be prepared in the following manner. A pre-condensate of a water-based thermosetting resin is prepared in a conventional manner and the water content is adjusted to give a dry content of 30 to 75 percent by weight. Unexpanded thermoplastic particles, so-called microspheres, are added to the obtained solution. The microspheres are added in such an amount that the weight ratio of microspheres to resin in the finished foam composite material will vary between 4:1 and 1:50. The microspheres are advantageously present in such an amount that they, in expanded condition, make up from 70 to 95, preferably from 85 to 95, percent by volume of the foam composite material. A material in the form of a web is impregnated with the mixture of resin and microspheres in a conventional way, e.g. by immersing the web in a bath of the mixture or by spraying the mixture on the web. The impregnated web, whose degree of impregnation can be adjusted for example by pressing with rolls, is then treated thermally, suitably by means of circulating hot air having a temperature of 80° to 150° C., so that the resin sets to the B-stage and the microspheres expand. In this context it should be mentioned that a curable resin in the A-stage is meltable, poorly cross-linked and soluble in acetone and several other solvents. A resin in the C-stage is not meltable, completely cross-linked and insoluble. The B-stage is a stage between the A-stage and the C-stage.

It has now been found that a similar material can be produced in a simplified manner in already existing plants for the production of glass- or mineral fibres. In these known processes melts of glass or mineral are first prepared at high temperatures. These melts are then converted to separate fibres e.g. by means of fine nozzles or dies. In a room or shaft an essentially water-based solution or dispersion of a thermosetting resin is then applied to the free fibres. When the resin coated fibres get in contact with each other they will form agglomerates of several fibres and these are collected at the bottom of the room or shaft. When a layer of agglomerates having a suitable thickness has been obtained, the layer is pressed to a suitable thickness.

Using the above described method and introducing exandable particles, microspheres, which have a shell of thermoplastic material and contain a blowing agent, in the resin solution, which microspheres are brought to expand in the room or shaft at a temperature of 80° to 150° C., preferably 100°-120° C. makes it possible to prepare, in a very simple manner, a material which is similar to the material described in the Swedish patent application No. 8003776-5. In the material prepared according to the present method the fibres may, however, be arbitrarily oriented and it is not necessary that the fibres should be present in the form of a web as is necessary in the product according to the Swedish patent application. Further, according to the present invention it is possible to produce a comparatively thick sheet from only one layer of agglomerate having a suitable thickness, and this is not possible according to the known method which requires that several separate layers of the impregnated web-form material are pressed together if a thick material shall be obtained. According to the present method it is further possible to collect the formed agglomerates and convert them to a desired configuration for the manufacturing of shaped objects, whereby the production of these suitably is carried out by pressing or moulding at an elevated temperature for final setting of the resin to the C-stage.

The method of the invention gives a composite material in which the brittleness of the curable resin and the "creep" of the thermoplastic material have been kept back, while such advantageous properties as stiffness and impact strength are emphasized in the material. It is further possible to obtain materials having very satisfactory resistance to climate factors, fire and chemicals. The presence of the expanded thermoplastic particles results in a material of low density.

The curable resins which may be used are so-called formaldehyde based resins with urea, phenol, resorcinol or melamine. Preferably phenol is used.

The microspheres used in the production of the fibre composite material according to the invention have shells which may be made up of copolymers of vinyl chloride and vinylidene chloride, copolymers of vinyl chloirde and acrylonitrile, copolymers of vinylidene chloride and acrylonitrile and copolymers of styrene and acrylonitrile. Further, copolymers of methyl methacrylate containing up to about 20 percent by weight of styrene, copolymers of methyl methacrylate and up to about 50 percent by weight of combined monomers of ethyl methacrylate, copolymers of methyl methacrylate and up to about 70 percent by weight of ortochlorostyrene may be mentioned. The particle size of the unexpanded spheres, and, accordingly, of the expanded spheres, may vary within wide limits and is selected with respect to the desired properties of the finished product. As examples of particle sizes for the unexpanded spheres can be mentioned 1 $\mu$m to 1 mm, preferably 2 $\mu$m to 0.5 mm and especially 5 $\mu$m to 50 $\mu$m. At the expansion, the diameter of the microspheres increases by a factor 2 to 5. The unexpanded spheres contain volatile, liquid blowing agents which are vaporized at the application of heat. These blowing agents may consist of freones, hydrocarbons, such as n-pentane, i-pentane, neo-pentane, butane, i-butane or other blowing agents conventionally used in microspheres of the described type. Suitably 5 to 30 percent by weight of the microspheres consist of blowing agent. The microspheres may be added to the resin solution in the form of dried particles or in a suspension, e.g. in an alcohol such as methanol.

As mentioned previously, the ratio between resin and microspheres in the impregnating solution may vary within wide limits and this ratio affects the properties of the final product. On the other hand, starting from a certain field of application and certain desired properties of the final product it is possible to select a suitable ratio of resin to microspheres in the mixture. This ratio can easily be determined by preparatory experiments on a laboratory scale.

Different additives, such as stabilizers, coupling agents, fillers, flame retarding agents and/or pigments can be added to the mixture of resin and microspheres, if it is desired or required.

The amount of fibres in the fibre composite material of the invention can be 10 to 150 parts by weight, per 100 parts by weight of the total weight of microspheres and resin, whereby the ratio of microspheres to resin can vary between 5:95 and 80:20. The amount of fibres is preferably 15 to 75 parts by weight per 100 parts by weight of the total weight of resin and microspheres, and the ratio of microspheres to resin is then preferably within the range 15:85 to 30:70.

The use of a mixture of resin and microspheres as discussed is preferred since this gives the best contact and adhesion between these components but it is of course also possible to add the microspheres to the fibre material separated from the resin solution.

It is possible to add the microspheres in unexpanded form and to expand these after deposition of the fiber web, in principle at any time up to the final curing of the resin. It is, however, preferred that the microspheres are expanded at latest in connection with the deposition of the web since any later expansion may encounter problems with uneven heating. When a mixture of resin and microspheres is added as mentioned it is suitable to conduct the mixing with unexpanded microspheres and then expand these since it is otherwise hard to incorporate and effeiciently wet a sufficient amount of the microspheres in the mixture.

The resin may be added when in A-stage and can with advantage be transformed into the B-stage in connection with the deposition into the bed as mentioned. The bed can then be compressed or reshaped in some other way in connection with the final curing into the C-stage, whereby if desired the material simultaneously can be laminated to other materials by using at the final curing the remaining bonding capacity of the resin. All the steps, i.e. the deposition of the web with resin and microspheres, compressing and possible reshaping and final curing with possible lamination, can with advantage take place as a sequence in a batch operation or continuously without substantial intermediate storage. The compressed material with resin in the B-stage can, however, also be treated as a prefabricated product for later final curing. The final curing can take place with external heating or by using the heat generated at the curing of the resin.

The invented method allows the manufacture of rather thick sheets in a single step without laminating several parts together, which sheets may be substantially reshaped at different kinds of molding press operations. The thickness can for example be between 1 mm and 500 mm and especially useful thicknesses are between about 3 mm and 100 mm after compression.

Although the invention has been described in relation to the preferred application at manufacture of glass- or mineral fibres it is of course also possible to apply the invention also for deposition of other types of fibres and also without the use of heated shafts.

EXAMPLE

A mixture was prepared of 1 part unexpanded microspheres of a copolymer of vinylidenchloride and acrylonitrile of about 10 micrometer, 5 parts (dry weight) phenolic resin and enough water to give the final mixture a dry content of about 45 percent by weight. This mixture was sprayed into a tower into which also melted glass was injected in the form of fine streams. For 100 parts by weight of glass 220 parts by weight (dry substance) of the mixture was sprayed into the tower. The temperature in the tower was about 145 centigrades. The microspheres expanded to about 3 times their original diameter in the tower and were collected at the bottom together with the glass fibre material. The residence time for the microspheres in the tower was about 35 seconds and during this time the resin cured into B-stage. The mixture of microspheres, resin and glass fibres, having a moisture content of about 7 percent, was removed from the tower and was compacted for about 3 minutes to about twice its density in a press with heated plates until the resin was cured into C-stage. The material had a density of about 250 kg/cubic meter.

I claim:

1. A method for producing a fibre composite material containing fibres, expanded thermoplastic microspheres and a resin of curable type, comprising the steps of
    (a) dispersing in a room separate and free fibres,
    (b) applying to the dispersed and free fibres
        (1) a curable resin and
        (2) unexpanded thermoplastic microspheres containing a volatile, liquid blowing agent,
    (c) heating the unexpanded thermoplastic microspheres until they expand and
    (d) collecting an agglomerate of fibres, expanded microspheres and resin.

2. The method of claim 1 in which the unexpanded thermoplastic microspheres and the resin are mixed before being applied to the fibres.

3. A method according to claim 1 in which the curable resin is a formaldehyde-based resin with urea, phenol, resorcinol and/or melamine.

4. A method according to claim 1 or 3 in which the resin is applied in the form of a water-based solution or dispersion.

5. A method according to claim 1 in which the discrete fibres are formed from a melt of glass or mineral.

6. A method according to claim 1 or 5 in which the curable resin is applied to the free fibers in a room or a shaft having an elevated temperature.

7. A method according to claim 6 in which the temperature in the room or shaft is between 80° to 150° C., preferably between 100° and 120° C.

8. A method according to claim 1 in which the resin is transformed essentially into the B-stage in the collected agglomerate.

9. A method according to claim 1 in which the collected agglomerate is formed and the resin is cured to the C-stage at an elevated temperature.

10. A method according to claim 1 in which the ratio of applied weight amounts of microspheres to resin is between 5:95 and 80:40.

* * * * *